(12) United States Patent
LaRose et al.

(10) Patent No.: US 11,511,346 B2
(45) Date of Patent: Nov. 29, 2022

(54) HYBRID MANUFACTURING PROCESS FOR HEAT EXCHANGER

(71) Applicant: Hamilton Sundstrand Corporation, Charlotte, NC (US)

(72) Inventors: Ronald P. LaRose, Cheshire, CT (US); Lawrence A. Binek, Glastonbury, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 194 days.

(21) Appl. No.: 16/706,105

(22) Filed: Dec. 6, 2019

(65) Prior Publication Data
US 2021/0170485 A1 Jun. 10, 2021

(51) Int. Cl.
*B33Y 10/00* (2015.01)
*B22F 10/00* (2021.01)
*B22F 5/00* (2006.01)
*B33Y 80/00* (2015.01)

(52) U.S. Cl.
CPC ............... *B22F 10/00* (2021.01); *B22F 5/00* (2013.01); *B33Y 10/00* (2014.12); *B33Y 80/00* (2014.12)

(58) Field of Classification Search
CPC .. B22F 10/00; B22F 5/00; B22F 10/28; B22F 2005/005; B22F 5/10; B22F 7/08; B22F 10/68; B22F 10/50; B33Y 10/00; B33Y 80/00; B33Y 40/00; Y02P 10/25; F28F 2255/18; F28F 7/02
See application file for complete search history.

(56) References Cited

U.S. PATENT DOCUMENTS

| | | | | |
|---|---|---|---|---|
| 5,775,402 | A | * | 7/1998 | Sachs ..................... B29C 33/04 164/4.1 |
| 7,950,149 | B2 | | 5/2011 | Golecki |
| 8,828,311 | B2 | * | 9/2014 | Medina ................. B33Y 10/00 419/10 |
| 9,638,471 | B2 | | 5/2017 | Neumann et al. |
| 9,746,257 | B2 | * | 8/2017 | Fennessy ................. B22F 3/11 |
| 9,777,965 | B2 | | 10/2017 | Chordia et al. |
| 10,107,555 | B1 | | 10/2018 | Miller |
| 10,222,142 | B2 | | 3/2019 | Alvarez et al. |
| 10,323,887 | B2 | * | 6/2019 | Fennessy ................ F28F 21/08 |
| 10,722,943 | B2 | * | 7/2020 | Versluys ................ B33Y 10/00 |

(Continued)

FOREIGN PATENT DOCUMENTS

GB 2537503 A 10/2016

OTHER PUBLICATIONS

Extended European Search Report for EP Application No. 20198727.8, dated Apr. 26, 2021, pp. 8.

*Primary Examiner* — Lawrence Averick
(74) *Attorney, Agent, or Firm* — Kinney & Lange, P.A.

(57) ABSTRACT

A method of constructing a heat exchanger includes providing a base, and additively manufacturing a plurality of first walls substantially parallel and substantially vertical while being manufactured, wherein the plurality of first walls are spaced apart and attached to the base. The method also includes removing at least a portion of a build powder located between the plurality of first walls and attaching a parting sheet to the plurality of first walls. The method also includes additively manufacturing a plurality of second walls substantially parallel and substantially vertical while being manufactured and are spaced apart.

8 Claims, 2 Drawing Sheets

(56) References Cited

U.S. PATENT DOCUMENTS

| | | | |
|---|---|---|---|
| 2010/0291401 A1* | 11/2010 | Medina | B23K 26/38 |
| | | | 219/121.66 |
| 2014/0336680 A1* | 11/2014 | Medina | B23K 35/0244 |
| | | | 219/121.72 |
| 2017/0045313 A1* | 2/2017 | Fennessy | B23P 15/26 |
| 2017/0197249 A1* | 7/2017 | Versluys | B29C 64/153 |
| 2017/0205149 A1* | 7/2017 | Herring | F28D 7/0025 |
| 2017/0336155 A1* | 11/2017 | Fennessy | B22F 10/28 |
| 2018/0015539 A1* | 1/2018 | Versluys | B33Y 80/00 |
| 2018/0045471 A1 | 2/2018 | Dietrich | |
| 2018/0164055 A1* | 6/2018 | Veilleux, Jr. | B60K 11/04 |
| 2018/0292146 A1 | 10/2018 | Furrer et al. | |
| 2018/0372416 A1* | 12/2018 | Vargas | F28F 1/26 |
| 2019/0063848 A1* | 2/2019 | Miller | F28F 13/06 |
| 2019/0301816 A1* | 10/2019 | Yun | F28F 7/02 |

\* cited by examiner

HYBRID MANUFACTURING PROCESS FOR HEAT EXCHANGER

BACKGROUND

The present disclosure relates generally to thermal management. More specifically, this disclosure relates to heat exchangers in an aircraft having a gas turbine engine.

In a gas turbine engine, air is pressurized in a compressor and mixed with fuel in a combustor for generating hot combustion gases which flow downstream through turbine stages. During operation, significant heat is generated by the high-pressure compressor, which generates high temperature flow. As aircraft engine efficiency has been improved over the years, there has been a general trend toward generating hotter temperatures in the engine core. Even when materials are used with higher heat tolerances, the parts within the engine core may still experience thermal fatigue over time. There is a need to effectively manage these temperatures in order to maximize the useful life of engine core parts. For example, one method of doing this is by using bleed air to cool components. However, it may also be necessary to control the temperature of the compressor discharge air prior to such bleed air cooling other engine components.

Complex heat exchangers having, for example, narrow or torturous flow paths can be built using additive manufacturing techniques. However, the downskin surface of the roofs of the channels limit the design space. The downskin surfaces are very rough and are prone to cracks and leakages. Additionally, heat exchanger channel roof length is limited by critical build angles present in the additive manufacturing process if the roofs are built without support structures. As such, not only are high aspect ratio channels difficult to build, but these channels also present a significant challenge for removal of any remaining build powder once the heat exchanger has been built.

SUMMARY

A method of constructing a heat exchanger includes providing a base, and additively manufacturing a plurality of first walls substantially parallel and substantially vertical while being manufactured, wherein the plurality of first walls are spaced apart and attached to the base. The method also includes removing at least a portion of a build powder located between the plurality of first walls and attaching a parting sheet to the plurality of first walls. The method also includes additively manufacturing a plurality of second walls substantially parallel and substantially vertical while being manufactured and are spaced apart.

A heat exchanger includes a base and a plurality of substantially parallel and substantially vertical walls spaced apart and integrally formed with the base via additive manufacturing. The heat exchanger also includes at least one parting sheet not integrally formed with the plurality of walls, but being attached to the plurality of walls, defining flow channels between the walls, the base, and the at least one parting sheet.

DETAILED DESCRIPTION

A heat exchange device and a method of making the heat exchange device is disclosed herein. The heat exchange device is built using a hybrid build process which can allow high aspect ratio flow channels to be built without the use of support structures. The hybrid build process can also allow removal of the build powder during the manufacturing process, which simplifies the final build steps.

Figure 1:
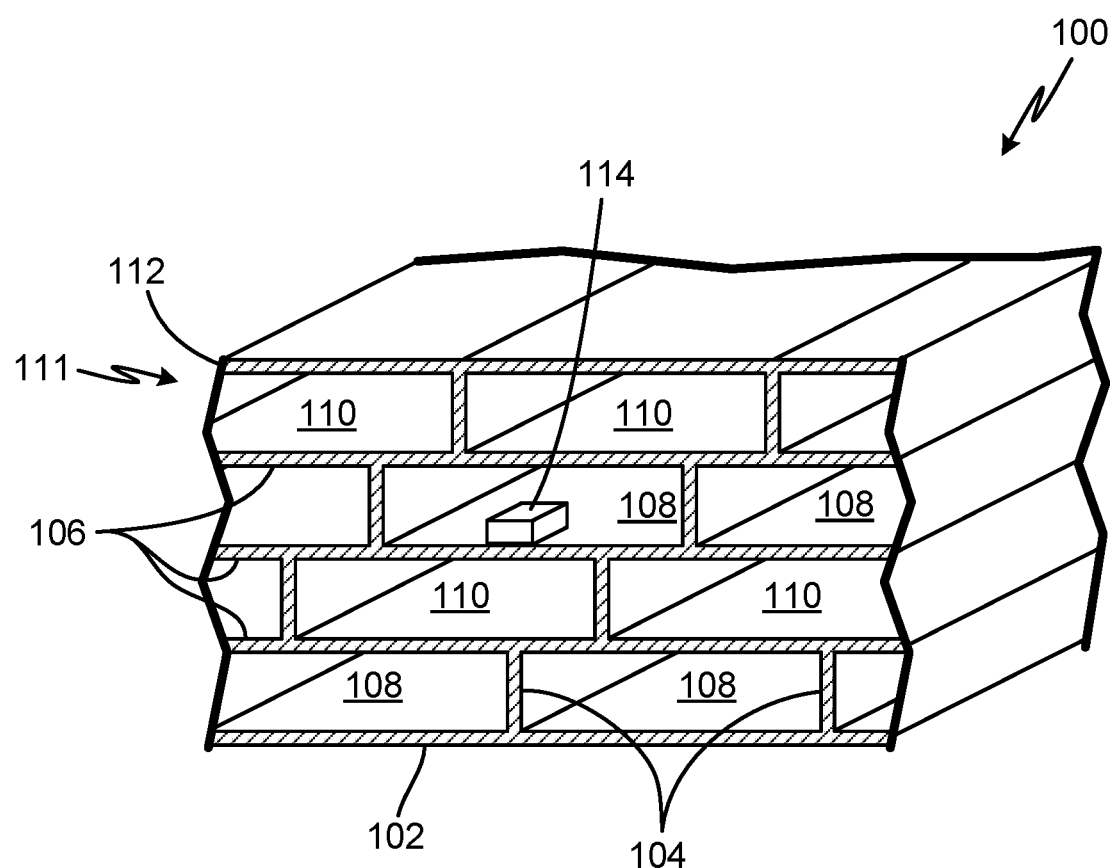
FIG. 1 is a perspective view of a cross-section of a heat exchanger.

FIG. 1 is a perspective view of a cross-section of a heat exchanger. FIG. 1 shows a section of heat exchanger 100 including base 102, walls 104, parting sheets 106, first flow channels 108, second flow channels 110, upper most layer 111, upper most cap 112, and flow enhancement/heat transfer enhancement feature 114. Base 102 is attached to a subset of walls 104. Parting sheets 106 are connected to walls 104, which separate each parting sheet 106 from each other throughout heat exchanger 100. Another subset of walls 104 within upper most layer 111 are attached to upper most cap 112. Base 102, walls 104, together with upper most cap 112 define both set of channels 108 and set of channels 110.

One or more channels can also include flow enhancement/heat transfer enhancement feature 114 attached to base 102 or parting sheet 106, which is configured to enhance either fluid flow through the channel, heat transfer between the hot and cold channels, or both. Although depicted in FIG. 1 as having a rectangular shape, flow enhancement/heat transfer enhancement feature 114 can be any shape or configuration such as, for example, a point, fin, bar, ramp, or airfoil. Flow enhancement/heat transfer enhancement feature 114 can be in any number of channels or sets of channels, for example, flow enhancement/heat transfer enhancement feature 114 can be in all the channels, all the hot or all the cold channels, or in every other channel, or in some other subset of channels. The channels can also have more than one flow enhancement/heat transfer enhancement feature 114 or different channels can have different flow enhancement/heat transfer enhancement features 114 in each channel.

In one embodiment, as depicted in FIG. 1, flow channels 108 can port a first fluid in a first direction and flow channels 110 can port a second fluid in a second opposite direction, which can be referred to as a counter-flow design. In one embodiment, flow channels 108 and flow channels 110 can port the first and second fluids in substantially the same direction, which can be referred to as a parallel-flow design. In one embodiment, flow channels 108 and flow channels 110 can port the first and second fluids substantially perpendicular to or at some other angle to one another, which can be referred to as a cross-flow design.

Heat exchanger 100 includes alternating hot layers formed of one set of channels 108 and cold layers formed of one set of channels 110, with any two vertically-adjacent hot layers defining a cold layer therebetween. The number of vertical layers refers to the number of hot layers in heat exchange 100. In the illustrated embodiment, there are two hot layers formed of channels 108 and two cold layers formed of channels 110. In any particular embodiment, the number of hot layers will generally be similar to the number of cold layers. In other embodiments, heat exchanger 100 can have any number of hot and cold layers.

The structural components of heat exchanger 100, including base 102, walls 104, parting sheets 106, and upper most cap 112 can be made up of any metal or alloy capable of withstanding the operational temperature range of heat exchanger 100. For example, aluminum can be used if the operational temperature range of heat exchanger 100 is below approximately 450° F. (230° C.). However, for the operational temperature range from 1100° F. (590° C.) to 1200° F. (650° C.), a nickel based alloy would typically be used, such as, for example, Inconel 625 or Haynes® 230®. Examples of other metals and alloys that can be used, but not limited to, are copper, copper alloys, aluminum-bronze, nickel, nickel alloys, cobalt, cobalt alloys, titanium, titanium alloys, titanium aluminides, stainless steel alloys, and composite materials.

Figure 2A:
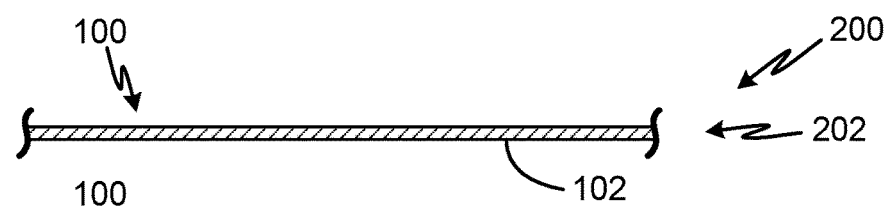
FIGS. 2A-2F are cross-sectional views of a heat exchanger build process.

FIGS. 2A-2F are cross-sectional views of a heat exchanger build process. FIG. 2 shows build process 200 of a section of heat exchanger 100 including steps 202, 204, 206, 208, 210, and 212. Step 202, shown in FIG. 2A, is the formation of base 102 of heat exchanger 100. Base 102 can be built using additive manufacturing techniques such as laser powder bed fusion, wire-arc additive manufacturing, laser wire deposition, and electron beam melting. Alternatively, base 102 can be formed of a cast or wrought material.

Figure 2B:
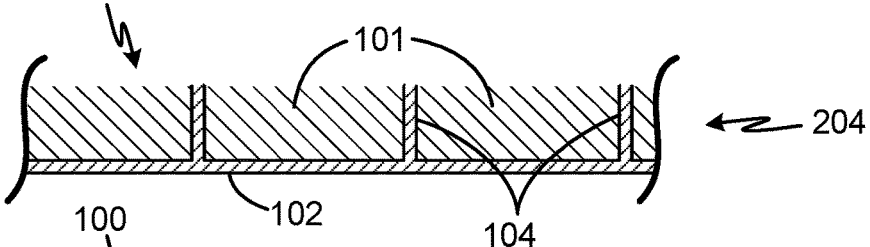

Step 204, shown in FIG. 2B, shows powder 101 being used to build walls 104 which can be integrally attached to base 102. In one embodiment, walls 104 are built substantially parallel to one another and in a substantially perpendicular direction to that of base 102. In other words, walls 104 are built at a substantially 90° build angle (a vertical direction) relative to base 104. In one embodiment, walls 104 or a portion of walls 104 are built using a build angle of less than 90°.

In one embodiment, base 102 is additively manufactured and walls 104 are integrally formed with and attached to base 102. In one embodiment, base 102 is formed of a cast or wrought material and walls 104 are fused or welded to base 102 as walls 104 are built in a layer by layer process. Base 102 and walls 104 can be formed of the same material or can be formed of different materials. Additional flow enhancement or heat transfer enhancement features can also be built on base 102 such as, for example, points, fins, bars, ramps, and airfoils. The flow enhancement or heat transfer enhancement features can extend the same height as walls 104 or can extend less than the height of walls 104.

Figure 2C:
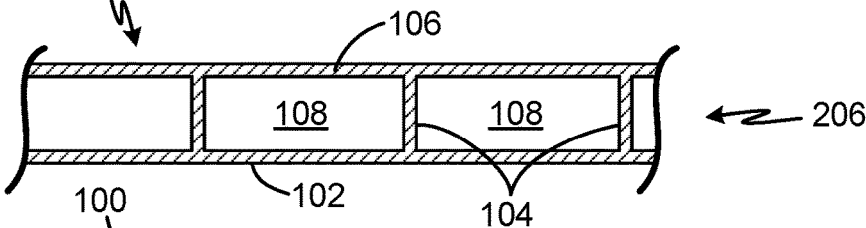

Step 206, shown in FIG. 2C, shows that powder 101 is removed and parting sheet 106 is attached to walls 104. Parting sheet 106 can be attached to walls 104 using the same power source used in the additive manufacturing process to fuse or weld parting sheet 106 to walls 104 such as using a laser or electron beam. Base 102 together with walls 104 and parting sheet 106 define first set of flow channels 108.

Powder removal before parting sheet 106 is attached enables more complex and torturous flow paths to be built. Conventionally, powder removal is performed after the build process is completed and can be, for example, performed by subjecting the heat exchanger to vibrations using a shaker and allowing gravity to pull the unused powder through the channels and exiting the heat exchanger through an outlet. As such, building a heat exchanger with narrow flow channels or torturous flow paths can inhibit unused powder removal using a vibration and gravity removal technique. By removing at least some of the powder during the disclosed build process can shorten the removal process compared to conventional techniques. Removing substantially all of the unused powder during the build process can eliminate the removal step at the end of the build process all together.

Figure 2D:
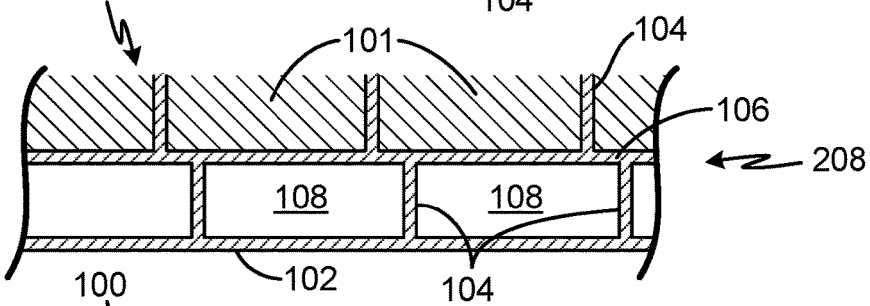

Step 208, shown in FIG. 2D, shows powder 101 being used to build another set of walls 104 which can be attached to parting sheet 106 and built in a layer by layer process. Walls 104, as shown in FIG. 2D can be staggered as one layer is built on another layer. In other words, walls 104 partially defining channels 110 can be placed at different locations along parting sheets 106 than walls 104 partially defining channels 108. Alternatively, walls 104 can substantially align with one another from one set of channels to the next. Similar to base 102, additional flow enhancement or heat transfer enhancement features can also be built on parting sheet 106 such as, for example, points, fins, bars, ramps, and airfoils (one embodiment is depicted in FIG. 1). The flow enhancement or heat transfer enhancement features can extend the same height as walls 104 or can extend less than the height of walls 104.

Figure 2E:
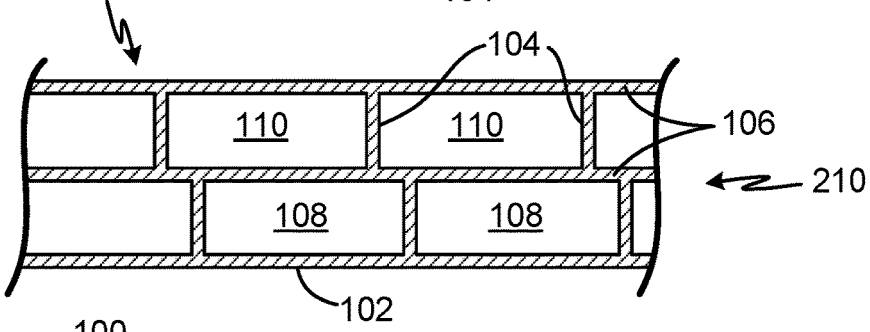
Figure 2F:
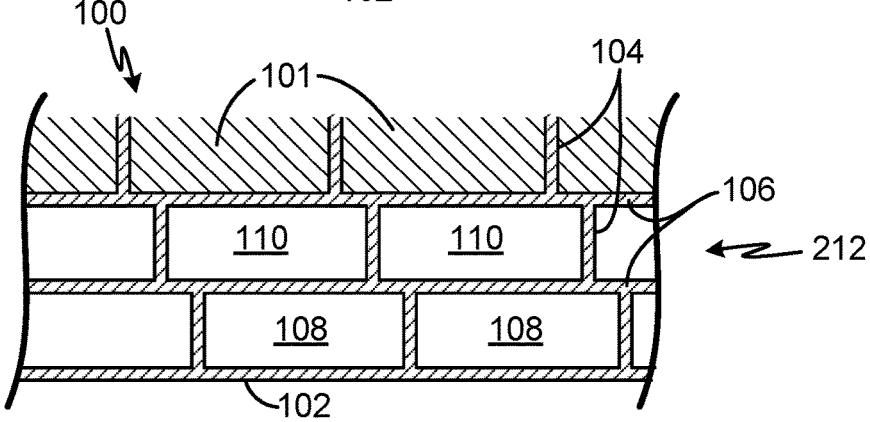

Step 210, shown in FIG. 2E, shows that powder 101 is removed and next parting sheet 106 is attached by, for example, fusion or welding to the next set of walls 104. Both partings sheets 106 together with next set of walls 104 define second set of flow channels 110. Step 212, shown in FIG. 2E, shows powder 101 being used to build another set of walls 104 which can be attached to parting sheet 106 and built in a layer by layer process.

Steps 210 and 212 can be repeated in an iterative process adding additional layers of flow channels 108 and 110 to heat exchanger 100 until an upper most layer is formed, which is capped by attaching an upper most cap to the plurality of walls within the upper most layer. Using parting sheets enables flow channels 108 and 110 to have high aspect ratio channels. In other words, the distance between walls 104 along base 102 or parting sheets 106 can be further than the height of wall 104. Conventionally, the distance between walls was limited due to the additive manufacturing process. For example, building structures at less than a 45° build angle typically requires additional support structures adding time, materials, and additional weight to the heat exchanger. Alternatively, the top of the channels are built at a 45° build angle, adding height to the channels. A heat exchanger built with low aspect ratio channels may exchange heat less efficiently than a heat exchanger built with high aspect ratio channels.

Furthermore, using parting sheets can reduce the risk of fluid leak from one set of channels to another set of channels compared to a heat exchanger with flow channels built using only additive manufacturing techniques, which can suffer from the presence of more defects leading to leakage. Additionally, fused joints or welds can be visually inspected for defects throughout the build process, such as after the addition of each parting sheet. Conventionally, inspection is performed after the build process is complete limiting visual inspection to external features or using expensive and time consuming non-destructive techniques such as X-ray analysis.

Discussion of Possible Embodiments

The following are non-exclusive descriptions of possible embodiments of the present invention.

A method of constructing a heat exchanger includes providing a base, and additively manufacturing a plurality of first walls substantially parallel and substantially vertical while being manufactured, wherein the plurality of first walls are spaced apart and attached to the base. The method also includes removing at least a portion of a build powder located between the plurality of first walls and attaching a parting sheet to the plurality of first walls. The method also includes additively manufacturing a plurality of second walls substantially parallel and substantially vertical while being manufactured and are spaced apart.

The method of the preceding paragraph can optionally include, additionally and/or alternatively, any one or more of the following features, configurations and/or additional components:

The method includes removing at least a portion of a build powder located between the plurality of second walls, attaching a parting sheet to the plurality of second walls, and additively manufacturing a plurality of third walls substantially parallel and substantially vertical while being manufactured, wherein the plurality of third walls are spaced apart. The method also includes repeating the steps in the preceding sentence in an iterative process until an upper most layer has been formed and attaching an upper most cap to the substantially parallel and substantially vertical walls of the upper most layer.

Removing at least the portion of the build powder is removing substantially all the build powder located between the plurality of walls.

Attaching the parting sheets to the plurality of walls is by laser welding techniques or electron beam melting techniques.

The method includes visually inspecting a site of attachment between the parting sheet and the plurality of walls.

Additively manufacturing a plurality of substantially parallel and substantially vertical walls includes additively manufacturing a flow enhancement feature or a heat transfer enhancement feature.

The flow enhancement feature or the heat transfer enhancement feature is a point, fin, bar, ramp, or airfoil.

The plurality of walls, the parting sheets, the base and the upper most cap define two sets of fluid channels, which are for porting a hot fluid through the first set of fluid channels and for porting a cold fluid through the second set of fluid channels.

Providing a base is achieved by additively manufacturing the base.

Providing a base is achieved by using a cast or wrought material.

A heat exchanger includes a base and a plurality of substantially parallel and substantially vertical walls spaced apart and integrally formed with the base via additive manufacturing. The heat exchanger also includes at least one parting sheet not integrally formed with the plurality of walls, but being attached to the plurality of walls, defining flow channels between the walls, the base, and the at least one parting sheet.

The heat exchanger of the preceding paragraph can optionally include, additionally and/or alternatively, any one or more of the following features, configurations and/or additional components:

The heat exchanger includes an upper most layer having an upper most cap attached to the plurality of walls within the upper most layer.

The heat exchanger includes a flow enhancement feature or a heat transfer enhancement feature attached to the base or at least one parting sheet.

The flow enhancement feature or the heat transfer enhancement feature is a point, fin, bar, ramp, or airfoil.

The plurality of walls, at least one parting sheet, and the base define two sets of fluid channels, which are for porting a hot fluid through the first set of fluid channels and for porting a cold fluid through the second set of fluid channels.

The first set of fluid channels and the second set of channels form layers and the first set of fluid channel layers alternate with the second set of channel layers.

The alternating first and second fluid layers are arranged in a parallel flow, counter-flow, or cross-flow arrangement.

The base is formed of a cast or wrought material.

The base is formed using additive manufacturing techniques.

A method of constructing a heat exchanger includes providing a base, additively manufacturing a plurality of substantially parallel and substantially vertical walls, wherein the plurality of walls are spaced apart and attached to the base, and removing at least a portion of a build powder located between the plurality of walls before attaching a parting sheet. The method includes attaching the parting sheet to the plurality of walls, additively manufacturing a plurality of substantially parallel and substantially vertical walls, wherein the plurality of walls are spaced apart and attached to the parting sheet, repeating the above steps until an upper most layer has been formed, and attaching an upper most cap to the substantially parallel and substantially vertical walls of the upper most layer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of constructing a heat exchanger, the method comprising:
   (a) providing a base;
   (b) additively manufacturing a plurality of first walls such that the first walls are substantially parallel to each other and substantially vertical while being manufactured, wherein the first walls are spaced apart from each other and attached to the base;
   (c) removing at least a portion of a build powder located between the plurality of first walls;
   (d) attaching a parting sheet to the plurality of first walls after removing at least the portion of the build powder;
   (e) additively manufacturing a plurality of second walls such that the second walls are substantially parallel to each other and substantially vertical while being manufactured, wherein the second walls are spaced apart from each other;
   (f) removing at least a portion of a build powder located between the plurality of second walls;
   (g) attaching a parting sheet to the plurality of second walls after removing at least the portion of the build powder;
   (h) additively manufacturing a plurality of third walls such that the third walls are substantially parallel to each other and substantially vertical while being manufactured, wherein the third walls are spaced apart from each other;
   (i) repeating steps (f)-(h) in an iterative process until an upper most layer has been formed; and
   (j) attaching an upper most cap to the substantially parallel and substantially vertical walls of the upper most layer;
   wherein the plurality of first walls, the plurality of second walls, the plurality of third walls, the parting sheets, the base and the upper most cap define two sets of fluid channels, which are for porting a hot fluid through the first set of fluid channels and for porting a cold fluid through the second set of fluid channels.

2. The method of claim 1, wherein removing at least the portion of the build powder is removing substantially all the build powder located between the plurality of walls.

3. The method of claim 1, wherein attaching the parting sheets to the plurality of walls is by laser welding techniques or by electron beam melting techniques.

4. The method of claim 1 and further comprising visually inspecting a site of attachment between the parting sheet and the plurality of walls.

5. The method of claim 1, wherein additively manufacturing a plurality of substantially parallel and substantially vertical walls includes additively manufacturing a flow enhancement feature or a heat transfer enhancement feature.

6. The method of claim 5, wherein the flow enhancement feature or the heat transfer enhancement feature is a point, fin, bar, ramp, or airfoil.

7. The method of claim 1, wherein providing a base is achieved by additively manufacturing the base.

8. The method of claim 1, wherein providing a base is achieved by using a cast or wrought material.

* * * * *